US012593132B2

(12) United States Patent
Liu et al.

(10) Patent No.: US 12,593,132 B2
(45) Date of Patent: Mar. 31, 2026

(54) CAMERA OPTICAL AXIS CALIBRATING SYSTEM AND CAMERA OPTICAL AXIS CALIBRATING METHOD

(71) Applicant: Wistron NeWeb Corporation, Hsinchu (TW)

(72) Inventors: Yen-Pin Liu, Hsinchu (TW); Wei-Hung Liao, Hsinchu (TW); Han-Chang Pan, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 141 days.

(21) Appl. No.: 18/732,736

(22) Filed: Jun. 4, 2024

(65) Prior Publication Data

US 2025/0175702 A1      May 29, 2025

(30) Foreign Application Priority Data

Nov. 23, 2023      (TW) ................................. 112145396

(51) Int. Cl.
*H04N 23/695*      (2023.01)
*H04N 23/56*      (2023.01)
*H04N 23/80*      (2023.01)
*H04N 23/90*      (2023.01)

(52) U.S. Cl.
CPC ........... *H04N 23/695* (2023.01); *H04N 23/56* (2023.01); *H04N 23/80* (2023.01); *H04N 23/90* (2023.01)

(58) Field of Classification Search
CPC ...... H04N 23/695; H04N 23/56; H04N 23/80; H04N 23/90; H04N 17/002; H04N 23/55; H04N 23/58
See application file for complete search history.

(56) References Cited

U.S. PATENT DOCUMENTS

| | | | |
|---|---|---|---|
| 2012/0300039 A1* | 11/2012 | Maison | H01L 22/12 |
| | | | 348/46 |
| 2017/0132774 A1* | 5/2017 | Ruprecht | H04N 17/002 |
| 2019/0098221 A1* | 3/2019 | Troy | H04N 7/18 |
| 2024/0397035 A1* | 11/2024 | Oko | H04N 17/002 |

* cited by examiner

*Primary Examiner* — Jennifer D Bennett
(74) *Attorney, Agent, or Firm* — McClure, Qualey & Rodack, LLP

(57)      ABSTRACT

A camera optical axis calibrating system includes at least two laser modules, a camera module and an analyzing module. The at least two laser modules generate at least two light beam sets. Each light beam set includes a first light beam and a second light beam, and a light beam angle difference is contained between the first light beam and the second light beam of each light beam set. The camera module at least includes a first camera assembly and a second camera assembly. The analyzing module is configured to confirm whether a space relation between the first camera assembly and the second camera assembly is that a first inclined line passes through a center of the first imaging plane, a second inclined line passes through a center of the second imaging plane, and an imaging angle difference is smaller than or equal to 1 degree.

18 Claims, 7 Drawing Sheets

CAMERA OPTICAL AXIS CALIBRATING SYSTEM AND CAMERA OPTICAL AXIS CALIBRATING METHOD

RELATED APPLICATIONS

This application claims priority to Taiwan Application Serial Number 112145396, filed Nov. 23, 2023, which is herein incorporated by reference.

BACKGROUND

Technical Field

The present disclosure relates to a camera calibrating system and a camera calibrating method. More particularly, the present disclosure relates to a camera optical axis calibrating system and a camera optical axis calibrating method employing at least two cameras.

Description of Related Art

With the improvement of the technique, electronic devices are widely used in modern society, especially smart phones, which become a part of the life. A smart phone includes a camera, and thus a user may shoot or record videos at any time. However, as the user requires higher image quality, a single camera is not enough.

Hence, some practitioners developed smart phones including two or three cameras to increase the image quality of the smart phone. For this kind of products having two or three cameras, optical axes of the cameras have to remain in a specific relation, for example, the optical axes cross each other at 10 m in front of the camera system.

In conventional camera optical axis calibrating methods, an area with a depth larger than 3 m is used, and at least one pattern is located in the area for the cameras to shoot. Then, the captured images, the coordinates of the system and the coordinates of the pattern can be used to calibrate the optical axis via a calculation of trigonometric functions. In this kind of camera optical axis calibrating method, the size of the area is defined by the spec requirements of the products and the optical parameters such as an effective focal length (EFL) of a single camera module and a field of view (FOV), and selection of the area will be limited by the large size requirement. Therefore, there is a need to improve the camera optical axis calibrating method.

Based on the above, how to develop a camera optical axis calibrating system and a camera optical axis calibrating method to overcome the problems of space requirements becomes a target that those pursue in the field.

SUMMARY

According to one aspect of the present disclosure, a camera optical axis calibrating system includes at least two laser modules, a camera module and an analyzing module. The at least two laser modules are configured to generate at least two light beam sets. Each of the at least two light beam sets includes a first light beam and a second light beam, and a light beam angle difference is contained between the first light beam and the second light beam of each of the at least two light beam sets. The camera module at least includes a first camera assembly and a second camera assembly. The first camera assembly has a first optical axis, the second camera assembly has a second optical axis, and an optical axis distance and an optical axis angle difference are contained between the first optical axis and the second optical axis. The first camera assembly shoots the first light beam of each of the at least two light beam sets to form a first imaging plane. The second camera assembly shoots the second light beam of each of the at least two light beam sets to form a second imaging plane. The first imaging plane includes at least two first imaging points that do not overlap and respectively correspond to the first light beams of the at least two light beam sets, and the second imaging plane includes at least two second imaging points that do not overlap and respectively correspond to the second light beams of the at least two light beam sets. The analyzing module is configured to analyze the first imaging plane and the second imaging plane. The light beam angle difference of at least one of the at least two light beam sets is equal to the optical axis angle difference. The analyzing module is configured to confirm whether a space relation between the first camera assembly and the second camera assembly is that the at least two first imaging points are located at a first inclined line passing through a center of the first imaging plane, the at least two second imaging points are located at a second inclined line passing through a center of the second imaging plane, and an imaging angle difference between a first imaging angle and a second image angle is smaller than or equal to 1 degree. The first imaging angle is contained between the first inclined line and a first horizontal axis of the first imaging plane, and the second imaging angle is contained between the second inclined line and a second horizontal axis of the second imaging plane.

According to another aspect of the present disclosure, a camera optical axis calibrating method includes an image forming step and an optical axis calibrating step. In the image forming step, at least two light beam sets are received by a camera module. The camera module at least includes a first camera assembly and a second camera assembly. Each of the two light beam sets at least includes a first light beam and a second light beam. The first camera assembly receives and shoots the first light beam of each of the at least two light beam sets to form a first imaging plane, and the second camera assembly receives and shoots the second light beam of each of the at least two light beam sets to form a second imaging plane. The first imaging plane includes at least two first imaging points that do not overlap and respectively correspond to the first light beams of the at least two light beam sets, and the second imaging plane includes at least two second imaging points that do not overlap and respectively correspond to the second light beams of the at least two light beam sets. In the optical axis calibrating step, a space relation of the first camera assembly and the second camera assembly is configured that the at least two first imaging points of the first imaging plane are located at a first inclined line passing through a center of the first imaging plane, the at least two second imaging points of the second imaging plane are located at a second inclined line passing through a center of the second imaging plane, and an imaging angle difference between a first imaging angle and a second image angle is smaller than or equal to 1 degree. The first imaging angle is contained between the first inclined line and a first horizontal axis of the first imaging plane, and the second imaging angle is contained between the second inclined line and a second horizontal axis of the second imaging plane.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
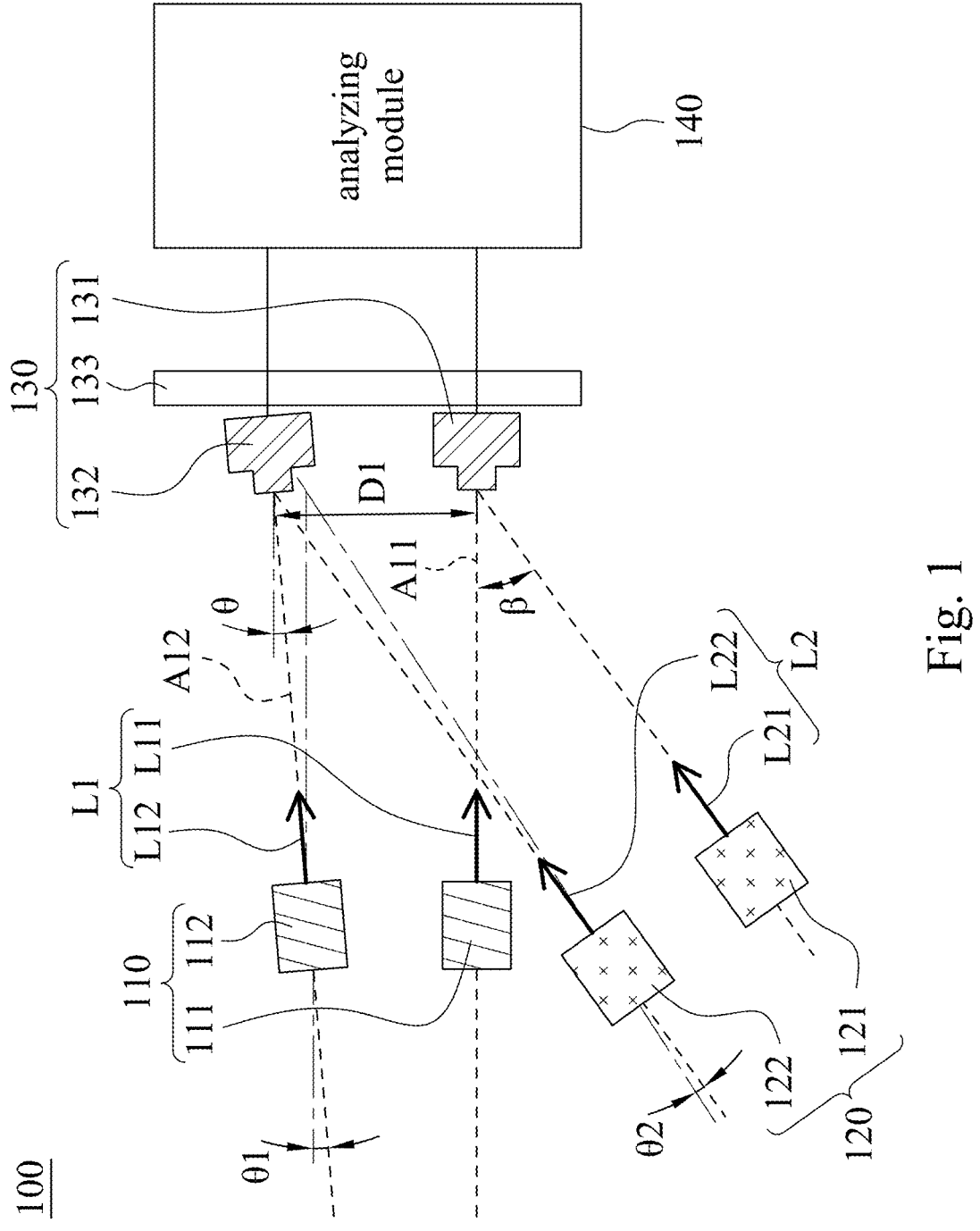
FIG. 1 shows a system configuration schematic view of a camera optical axis calibrating system according to a first embodiment of the present disclosure.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in the drawings in a simple way; the repeated elements may be labeled by the same or similar reference numerals.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 2:
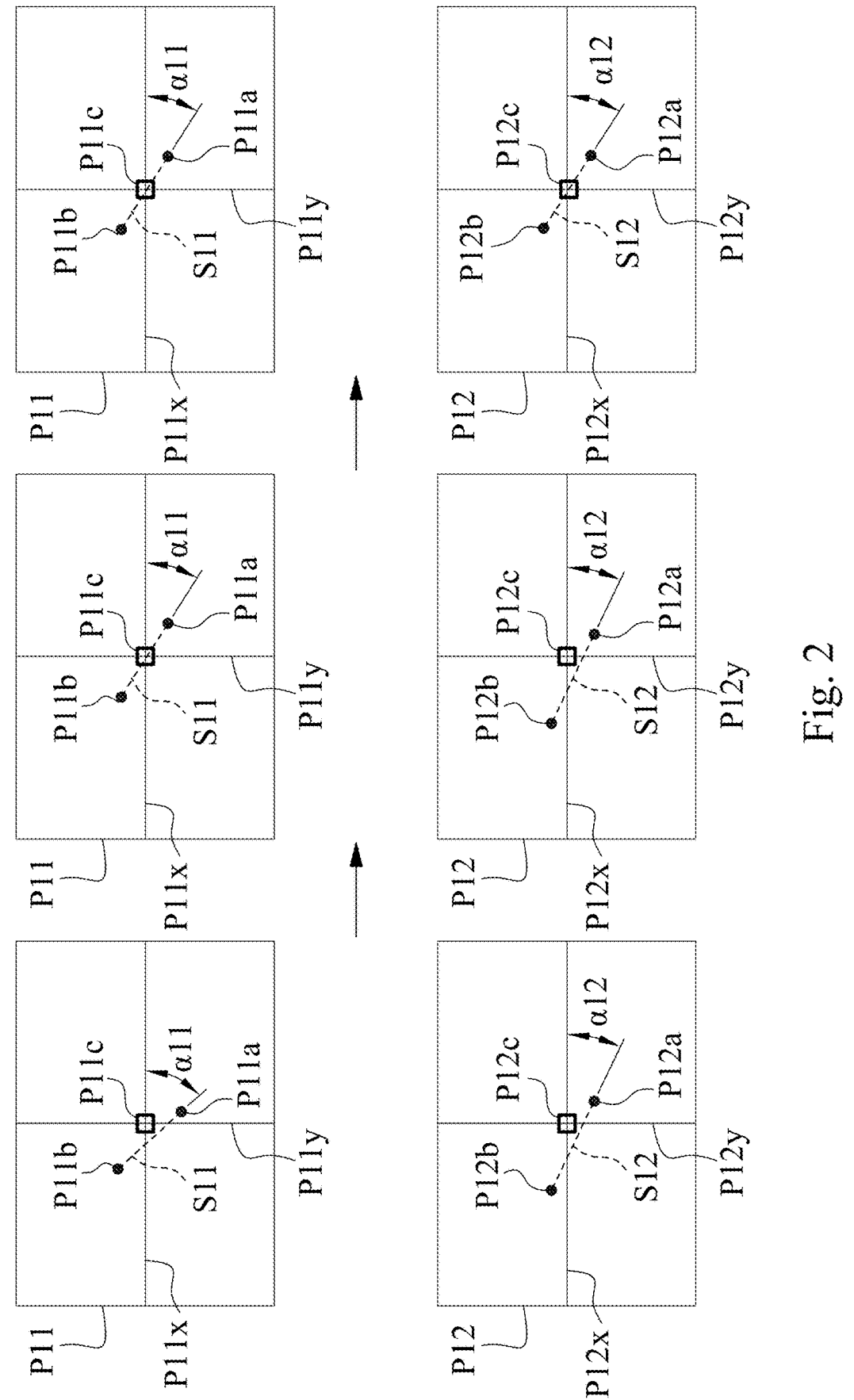
FIG. 2 shows a modifying schematic view of a first imaging plane and a second imaging plane of the camera optical axis calibrating system of the first embodiment of FIG. 1.

FIG. 1 shows a system configuration schematic view of a camera optical axis calibrating system 100 according to a first embodiment of the present disclosure. FIG. 2 shows a modifying schematic view of a first imaging plane P11 and a second imaging plane P12 of the camera optical axis calibrating system 100 of the first embodiment of FIG. 1. The camera optical axis calibrating system 100 includes at least two laser modules 110, 120, a camera module 130 and an analyzing module 140.

The at least two laser modules 110, 120 are configured to generate at least two light beam sets L1, L2. Each of the at least two light beam sets L1, L2 includes a first light beam L11, L21 and a second light beam L12, L22, a light beam angle difference θ1, θ2 are contained between the first light beam L11, L21 and a second light beam L12, L22 of each of the at least two light beam sets L1, L2. The camera module 130 at least includes a first camera assembly 131 and a second camera assembly 132. The first camera assembly 131 has a first optical axis A11, the second camera assembly

132 has a second optical axis A12, and an optical axis distance D1 and an optical axis angle difference θ is contained between the first optical axis A11 and the second optical axis A12. At least one of the light beam angle differences θ1, θ2 of the at least two light beam sets L1, L2 is equal to the optical axis angle difference θ. In other words, it can be that only the light beam angle difference θ1 or only the light beam angle difference θ2 is equal to the optical axis angle difference θ, or that both the light beam angle difference θ1 and the light beam angle difference θ2 are equal to the optical axis angle difference θ. The first camera assembly 131 shoots the first light beam L11, L21 of each of the at least two light beam sets L1, L2 to form the first imaging plane P11. The second camera assembly 132 shoots the second light beam L12, L22 of each of the at least two light beam sets L1, L2 to form the second imaging plane P12. The first imaging plane P11 includes at least two first imaging points P11a, P11b that do not overlap and respectively correspond to the first light beams L11, L21 of the at least two light beam sets L1, L2, and the second imaging plane P12 includes at least two second imaging points P12a, P12b that do not overlap and respectively correspond to the second light beams L12, L22 of the at least two light beam sets L1, L2.

The analyzing module 140 is configured to analyze the first imaging plane P11 and the second imaging plane P12. The analyzing module 140 is configured to confirm whether a space relation between the first camera assembly 131 and the second camera assembly 132 is that the at least two first imaging points P11a, P11b are located at a first inclined line S11 passing through a center of the first imaging plane P11, the at least two second imaging points P12a, P12b are located at a second inclined line S12 passing through a center of the second imaging plane P12, and an imaging angle difference between a first imaging angle α11 and a second image angle α12 is smaller than or equal to 1 degree. The first imaging angle α11 is contained between the first inclined line S11 and a first horizontal axis P11x of the first imaging plane P11, and the second imaging angle α12 is contained between the second inclined line S12 and a second horizontal axis P12x of the second imaging plane P12.

Therefore, with the configuration that the at least two laser modules 110, 120 generate the at least two light beam sets L1, L2, and each of the at least two light beam sets L1, L2 includes the first light beam L11, L21 and the second light beam L12, L22, the at least two first imaging points P11a, P11b can be obtained by the first camera assembly 131, and the at least two second imaging points P12a, P12b can be obtained by the second camera assembly 132. Moreover, with the adjustment of the first camera assembly 131 and the second camera assembly 132 to allow positions of the first imaging points P11a, P11b and the second imaging points P12a, P12b to satisfy the requirements, the calibration of the camera optical axis can be completed without requiring a large space or a large area, thereby favorable for increasing a flexibility of calibrating the camera optical axis. The details of the camera optical axis calibrating system 100 may be described hereinafter.

As shown in FIG. 1, the camera module 130 may further include a reference article 133, the first camera assembly 131 is fixed at the reference article 133, and the second camera assembly 132 is rotatably disposed at the reference article 133. The reference article 133 may be a plastic case, a metal frame or a circuit board, but the present disclosure is not limited thereto. In another embodiment, the first camera assembly may be rotatably disposed at the reference article, but the present disclosure is not limited thereto. In the first embodiment, each of the first camera assembly 131 and the second camera assembly 132 may include optical lenses and a light sensing assembly, and the first light beams L11, L21 and the second light beams L12, L22 respectively enter the optical lenses to allow the light sensing assemblies to generate digital signals for forming the first imaging plane P11 and the second imaging plane P12.

A number of the at least two laser modules 110, 120 may be two. A number of the at least two light beam sets L1, L2 may be two. Each of the two laser modules 110, 120 includes two laser sources 111, 112, 121, 122 respectively generating the first light beam L11, L21 and the second light beam L12, L22 of each of the two light beam sets L1, L2, each of the laser sources 111, 112, 121, 122 includes a light emitting axis, and an angle contained between the two light emitting axes of the two laser sources 111, 112, 121, 122 is equal to the light beam angle difference θ1, θ2. The first light beams L11, L21 and the second light beams L12, L22 generated by the laser sources 111, 112, 121, 122 may be visible laser light, which has good collimation and a small divergence angle (<100 mrad), thereby favorable for forming the first imaging points P11a, P11b and the second imaging points P12a, P12b with a point shape.

To be more specific, a first one of the laser modules 110, 120, that is, the laser module 110, includes the laser sources 111, 112, the light emitting axis of the laser source 111 overlaps the first optical axis A11, and an angle contained between the light emitting axis of the laser source 112 and the light emitting axis of the laser source 111 is equal to the light beam angle difference θ1. The laser source 111 emits the first light beam L11 along the light emitting axis thereof, and the first light beam L11 may then be captured by the first camera assembly 131 to form the first imaging point P11a of the first imaging plane P11. The laser source 112 emits the second light beam L12 along the light emitting axis thereof, and the second light beam L12 may then be captured by the second camera assembly 132 to form the second imaging point P12a of the second imaging plane P12. In other words, the laser module 110 is configured to form the first imaging point P11a of the first camera assembly 131 and the second imaging point P12a of the second camera assembly 132.

Similarly, a second one of the laser modules 110, 120, that is, the laser module 120, includes the laser sources 121, 122, an included angle β is contained between the light emitting axis of laser source 121 and the first optical axis A11, and the included angle β is larger than 0 degree and smaller than 90 degrees if the mechanism can be cooperated. Moreover, the included angle β is larger than 0 degree and smaller than 20 degrees. If the included angle β is set to be between 10 degrees to 20 degrees, the configuration of the mechanism can be improved to avoid mechanism interference between the laser modules 110, 120. The laser source 121 emits the first light beam L21 along the light emitting axis thereof, and the first light beam L21 can be captured by the first camera assembly 131 to form the first imaging point P11b of the first imaging plane P11. The laser source 122 emits the second light beam L22 along the light emitting axis thereof, and the second light beam L22 can be captured by the second camera assembly 132 to form the second imaging point P12b of the second imaging plane P12. In other words, the basic configuration of the laser module 120 is similar to the basic configuration of the laser module 110, but an angle, i.e., the included angle β, is contained therebetween, and the angle is favorable to be from 10 degrees to 20 degrees for a general operation. Moreover, the light beam angle difference θ2 of the laser module 120 may not be equal to the light beam angle difference θ1 of the laser module 110. In addition, a distance between the laser sources 121, 122 may be different from a distance between the laser sources 111, 112. The laser module 120 is used to form the first imaging point P11b of the first camera assembly 131 and the second imaging point P12b of the second camera assembly 132.

As shown in FIG. 2, the center of the first imaging plane P11 may include a first rectangle area P11c, and a side length of the first rectangle area P11c may be in a range of 2 pixels to 10 pixels. The center of the second imaging plane P12 may include a second rectangle area P12c, and a side length of the second rectangle area P12c may be in a range of 2 pixels to 10 pixels. Precisely, the first rectangle area P11c is defined as a rectangle area extending 1 pixel to 5 pixels along the first horizontal axis P11x and a first longitudinal axis P11y from a center point of the first imaging plane P11, i.e., a cross point of the first horizontal axis P11x and the first longitudinal axis P11y. The second rectangle area P12c is defined as a rectangle area extending 1 pixel to 5 pixels along the second horizontal axis P12x and a second longitudinal axis P12y from a center point of the second imaging plane P12, i.e., a cross point of the second horizontal axis P12x and the second longitudinal axis P12y.

The analyzing module 140 may be a processor, which may be programmable to identify images according to demands. Hence, the analyzing module 140 may identity positions of the first imaging points P11a, P11b of the first imaging plane P11 and positions of the second imaging points P12a, P12b of the second imaging plane P12 to calculate the first imaging angle α11 and the second imaging angle α12, and whether the space configuration of the first camera assembly 131 and the second camera assembly 132 achieves the requirement can be confirmed.

As shown in a left side of FIG. 2, in the beginning, the first inclined line S11 connected by the first imaging points P11a, P11b does not pass through the center of the first imaging plane P11, that is, not passing through the first rectangle area P11c. The second inclined line S12 connected by the second imaging points P12a, P12b does not pass through the center of the second imaging plane P12, that is, not passing through the second rectangle area P12c. The imaging angle difference between the first imaging angle α11 and the second image angle α12 is larger than 1 degree.

Later, as shown in a middle of FIG. 2, the first camera assembly 131 may be adjusted to allow the first inclined line S11 to pass through the center of the first imaging plane P11, and then the analyzing module 140 analyzes the second imaging plane P12 based on the first imaging plane P11. After which, the second camera assembly 132 is adjusted to allow the second inclined line S12 to pass through the center of the second imaging plane P12. The second camera assembly 132 may then keep being adjusted to allow the imaging angle difference between the first imaging angle α11 and the second image angle α12 to be smaller than or equal to 1 degree. Moreover, a first slope of the first inclined line S11 may be equal to a second slope of the second inclined line S12. Furthermore, the analyzing module 140 may calculate a line distance between the first imaging point P11a and the center of the first imaging plane P11 and a line distance between the first imaging point P11b and the center of the first imaging plane P11, the line distances are calculated in pixels, and the analyzing module 140 may then calculate a first ratio of the two line distances. As adjusting the positions of the second imaging points P12a, P12b of the second imaging plane P12, the analyzing module 140 may calculate a line distance between the second imaging point P12a and the center of the second imaging plane P12 and a line distance between the second imaging point P12b and the center of the second imaging plane P12, and the analyzing module 140 may then calculate a second ratio of the two line distances. Then, the second ratio may be adjusted to be equal to the first ratio. Finally, as shown in a right side of FIG. 2, the calibration of the camera optical axis of the camera module 130 may be completed. It is noted that the second ratio is equal to the first ratio is one of the embodiments of the present disclosure, and the present disclosure is not limited thereto. In other embodiments, there is no need to set the ratio to satisfy a special relation if the real optical spec of the first camera assembly and the second camera assembly are already known.

For a single camera assembly, calibration may be completed by adjusting at least one of the imaging points on the imaging plane to a specified position to allow positions of the two imaging points to satisfy a relation. Generally speaking, as the light beam generated by the laser source enters the camera assembly, the positions of the imaging points may represent the absolute relation between the light beam and the optical axis in the three dimension space. If there is only one light beam forming a single imaging point, the optical characteristics have to be measured in advance to known the specified position of the imaging point. However, if two light beams, i.e., the first light beam and the second light beam, are received by each of the camera assemblies as shown in the present disclosure, the position of the optical axis can be fixed depending on the relations between the first light beam, the second beam and the optical axis of the camera assembly, and there is no need to measure the optical characteristics of the camera assembly. In other embodiments, the camera optical axis calibrating system may include three laser modules to generate three light beam sets (six light beams in total) and two camera assemblies respectively receive three light beams. The camera module may include three camera assemblies, two laser modules may respectively include three laser sources, and the three laser sources of each of the laser modules emit three light beams (six light beams in total) respectively for the three camera assemblies. In other words, a number of the light beams is larger than or equal to two times of a number of the camera assemblies, but the present disclosure is not limited thereto.

Figure 3:
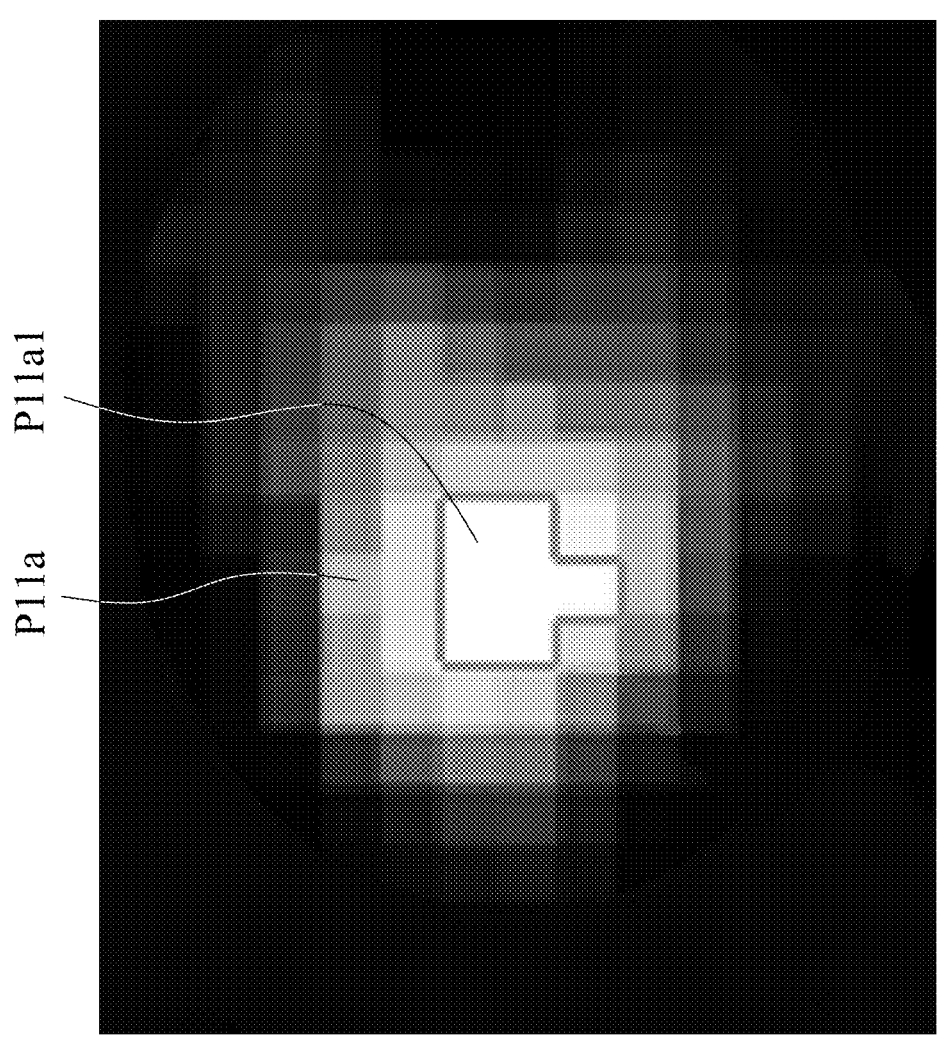
FIG. 3 shows a first imaging point of the first imaging plane of the first embodiment of FIG. 1.

FIG. 3 shows the first imaging point P11a of the first imaging plane P11 of the first embodiment of FIG. 1. Please refer to FIG. 3 with reference of FIG. 2. An imaging point is formed by a plurality of adjacent pixels with values. In the present disclosure, the imaging point is formed by a square with 2×2 pixels or larger than 2×2 pixels. The pixel with a maximum value may be defined as a center of the imaging point, which may be favorable for the later calculation. Moreover, if a plurality of pixels in a single imaging point have the same maximum value, a pixel central area is defined. As shown in FIG. 3, the first imaging point P11a includes a pixel central area P11a1, and a geometric center of the pixel central area P11a1 may be defined as the center of the first imaging point P11a. It is noted that the aforementioned definition of the center of the imaging point is only for illustration, and in other embodiments, the geometric center of all the pixels in the imaging point may be defined as the center of the imaging point, and the present disclosure is not limited thereto. It is further noted that, although the first imaging point P11a is illustrated in FIG. 3, the calculation of the centers of the first imaging point P11b and the second imaging points P12a, P12b are similar to the above.

Figure 4:
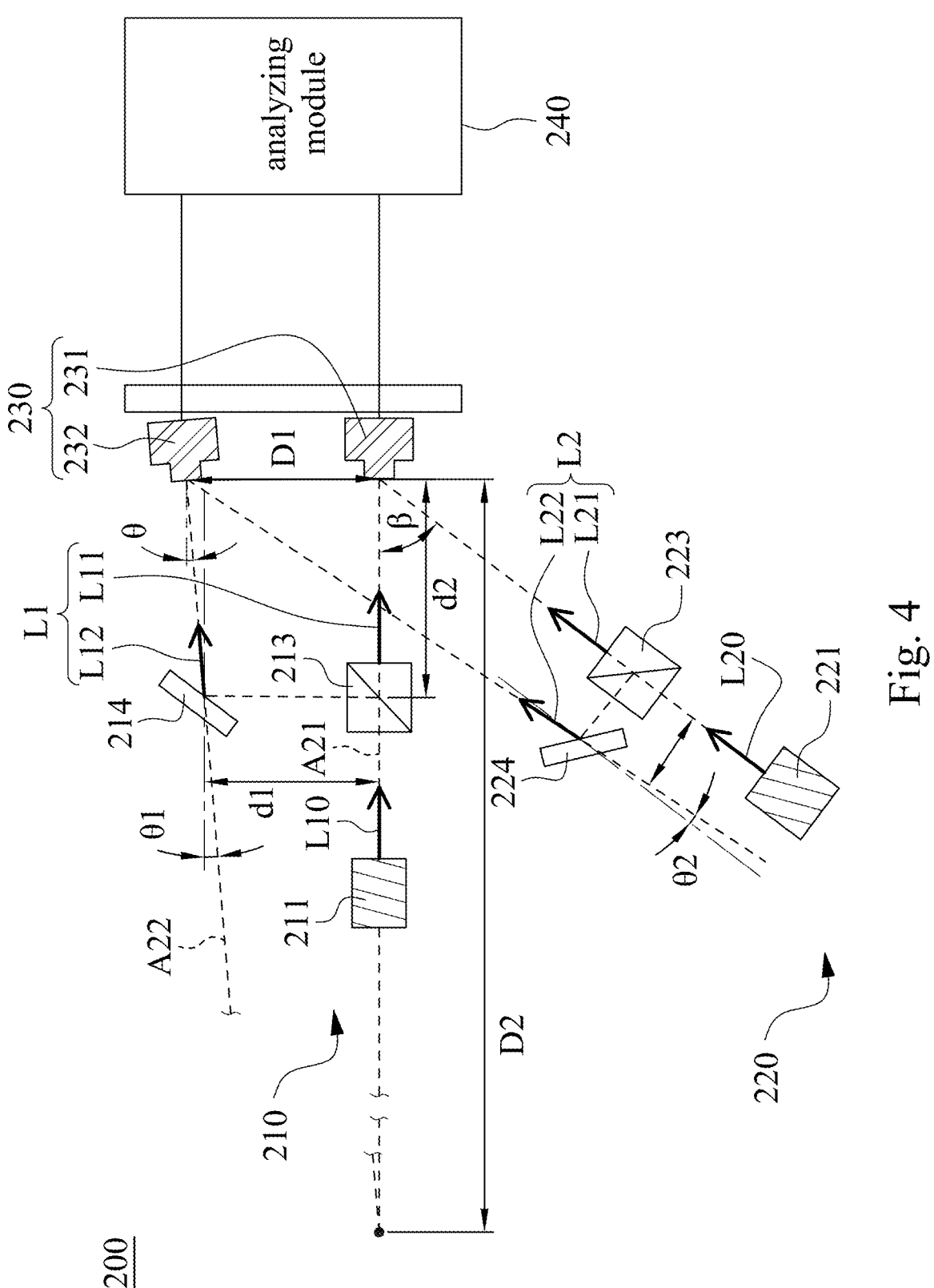
FIG. 4 shows a system configuration schematic view of a camera optical axis calibrating system according to a second embodiment of the present disclosure.

FIG. 4 shows a system configuration schematic view of a camera optical axis calibrating system 200 according to a second embodiment of the present disclosure. The camera optical axis calibrating system 200 includes two laser modules 210, 220, a first camera assembly 231, a second camera assembly 232 and an analyzing module 240. The principle of the camera optical axis calibrating system 200 is similar to the camera optical axis calibrating system 100, only the differences are described, and the similar features will not be repeated.

As shown in FIG. 4, the camera optical axis calibrating system 200 includes the two laser modules 210, 220, and each of the two laser modules 210, 220 includes a laser source 211, 221, a splitting lens 213, 223 and a reflecting lens 214, 224. In the laser module 210, an initial light beam L10 generated by the laser source 211 passes the splitting lens 213 corresponding thereto to form the first light beam L11 of the light beam set L1, and the initial light beam L10 generated by the laser source 211 passes the splitting lens 213 and the reflecting lens 214 corresponding thereto to form the second light beam L12 of the light beam set L1. Similarly, in the laser module 220, an initial light beam L20 generated by the laser source 221 passes the splitting lens 223 corresponding thereto to form the first light beam L21 of the light beam set L2, and the initial light beam L20 generated by the laser source 221 passes the splitting lens 223 and the reflecting lens 224 corresponding thereto to form the second light beam L22 of the light beam set L2. In other words, the laser module 210 adapts a single laser source 211, a single splitting lens 213 and a single reflecting lens 214 to generate the first light beam L11 and the second light beam L12 that do not overlap, and the laser module 220 are similar thereto.

Moreover, as configuring a first one of the at least two laser modules 210, 220, i.e., the laser module 210, d1 represents a locating distance between the splitting lens 213 and the reflecting lens 214 of the laser module 210, d2 represents a setting distance between the splitting lens 213 of the laser module 210 and the first camera assembly 231, D2 represents a cross point distance between a cross point of the first optical axis A21 and the second optical axis A22 and the first camera assembly 231, the light emitting axis of the laser module 210 overlaps the first optical axis A21, the locating distance d1 satisfies a condition of $d1=(D2-d2)\times\theta$, and $\theta$ represents the optical axis angle difference.

The cross point distance D2 may be defined in a stage of designing or configuring the product, and D1 may be decided as an optical axis distance between the first optical axis A21 and the second optical axis A22, which is defined by the product spec. Hence, the optical axis angle difference $\theta$ may be obtained by $D1=D2\times Tan(\theta)$. As the cross point distance D2 is much larger than the optical axis distance D1, $D1=D2\times Tan(\theta)$ may be simplified to $D1=D2\times\theta$. Because the second light beam L12 is formed by the initial light beam L10 passing through the splitting lens 213 and the reflecting lens 214, a reflecting point of the reflecting lens 214 should be located at the second optical axis A22, and the reflecting lens 214 is rotated with a rotated angle to allow the light beam angle difference $\theta1$ contained between the first light beam L11 and the second light beam L12 to be equal to the optical axis angle difference $\theta$. Therefore, the setting distance d2 may be decided previously, and then the locating distance d1 may be obtained by $d1=(D2-d2)\times\theta$. Consequently, the laser module 210 may be configured.

As configuring a second one of the at least two laser modules 210, 220, i.e., the laser module 220, the setting distance d2, the locating distance d1 and the rotated angle of the reflecting lens 224 are identical to the laser module 210, but the laser module 220 is rotated about the first camera assembly 231 to allow an included angle $\beta$ to be formed between the light emitting axis of the laser module 220 and the first optical axis A21, and then adjust the locating distance d1 of the laser module 220 to allow the second light beam L22 to enter the second camera assembly 232.

For the present disclosure, the light beams emitted by the laser module has no configuration limitation, but the direction relation between the light beams has to be measurable or controllable, and the light beams have to be received by the camera assembly to form imaging points on the imaging plane. Hence, the first light beams L11, L21 and the second light beams L12, L22 can be emitted by the two laser modules 110, 120 each employing two laser sources 111, 112, 121, 122 as shown in the first embodiment. The first light beams L11, L21 and the second light beams L12, L22 can also be emitted by the two laser modules 210, 220 each employing a single laser source 211, 221, the splitting lens 213, 223 and the reflecting lens 214, 224.

Figure 5:
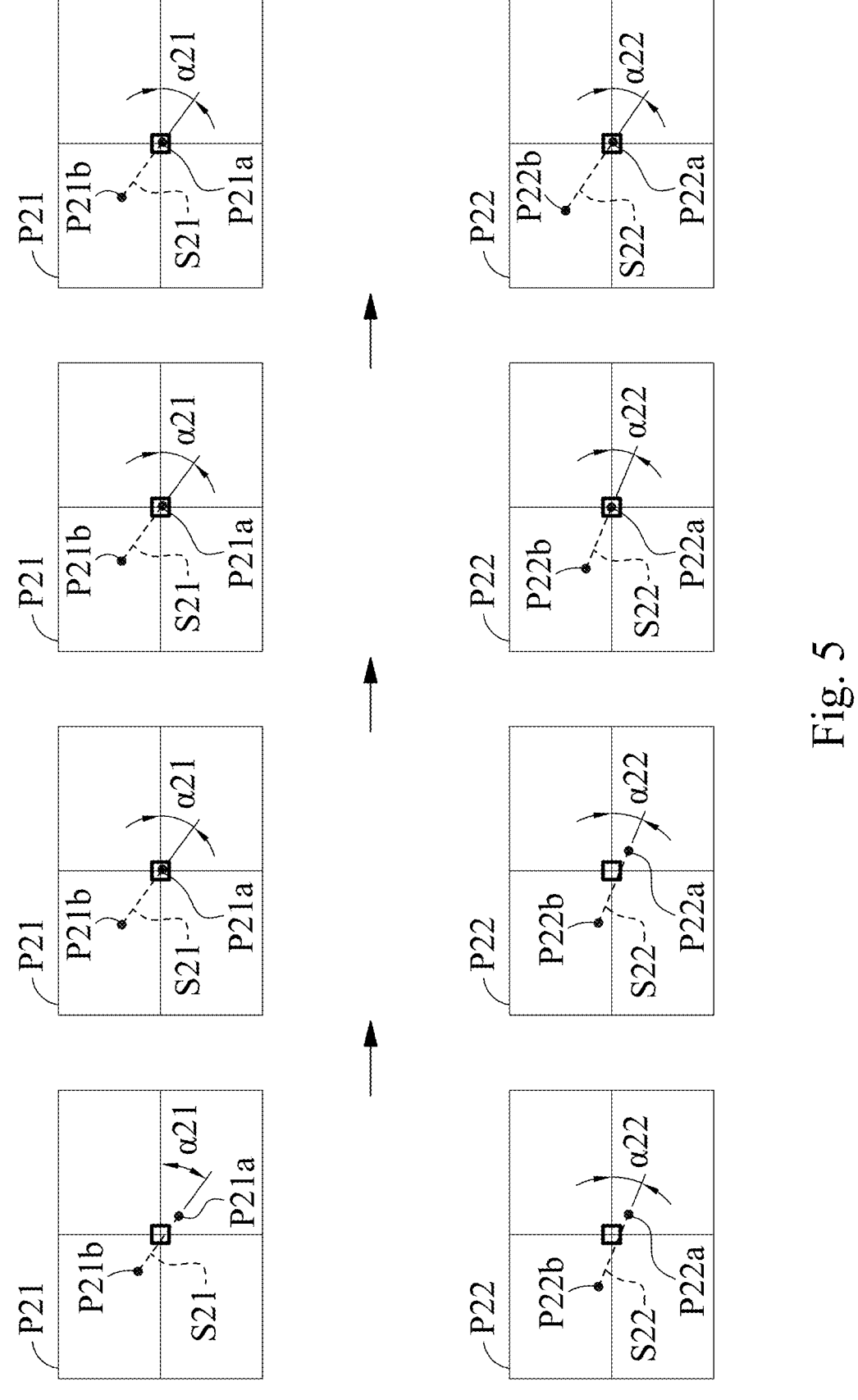
FIG. 5 shows a modifying schematic view of a first imaging plane and a second imaging plane of the camera optical axis calibrating system of the second embodiment of FIG. 4.

Please refer to FIG. 5 with reference of FIG. 4, and FIG. 5 shows a modifying schematic view of the first imaging plane P21 and the second imaging plane P22 of the camera optical axis calibrating system 200 of the second embodiment of FIG. 4. As shown in a left side of FIG. 5, in the beginning, the first imaging plane P21 includes first imaging points P21a, P21b, and the first imaging points P21a, P21b connect to form a first inclined line S21. The second imaging plane P22 includes second imaging points P22a, P22b, and the second imaging points P22a, P22b connect to form a second inclined line S22. Although the first inclined line S21 and the second inclined line S22 respectively pass through the center of the first imaging plane P21 and the center of the second imaging plane P22, but an imaging angle difference between a first imaging angle α21 and a second image angle α22 is larger than 1 degree.

Hence, as shown form the left side to a right side of FIG. 5, the camera module 230 is adjusted. The first camera assembly 231 is adjusted first to allow the first imaging point P21a to be located at the center of the first imaging plane P21, and then the analyzing module 240 takes the first imaging plane P21 as a reference to analyze the second imaging plane P22. After which, the second camera assembly 232 is adjusted to allow the second imaging point P22a to be located at the center of the second imaging plane P22. It is noted that although FIG. 5 shows that the first imaging point P21a and the second imaging point P22a are respectively located at the center point of the first imaging plane P21 and the center point of the second imaging plane P22, but the first imaging point P21a is only required to be located within the first rectangle area, and the second imaging point P22a is only required to be located within the second rectangle area.

Moreover, the second camera assembly 232 keeps fine tuning until the imaging angle difference between the first imaging angle α21 and the second image angle α22 is smaller than or equal to 1 degree, and the calibration can be completed. Furthermore, the second camera assembly 232 can keep fine tuning until a slope of the first inclined line S21 is equal to a slope of the second inclined line S22. It is noted that, as adjusting, it is prevented that the first imaging point P21a and the second imaging point P22b are respectively located at the center point of the first imaging plane P21 and the center point of the second imaging plane P22 at the same time, and it is also prevented that the first imaging point P21b and the second imaging point P22a are respectively located at the center point of the first imaging plane P21 and the center point of the second imaging plane P22 at the same time. In addition, although the embodiment shown in FIG. 4 adapts the adjusting method shown in FIG. 5, the embodiment shown in FIG. 4 can adapt the adjusting method shown in FIG. 2. Similarly, the embodiment shown in FIG. 1 can also adapt the adjusting method shown in FIG. 5.

Figure 6:
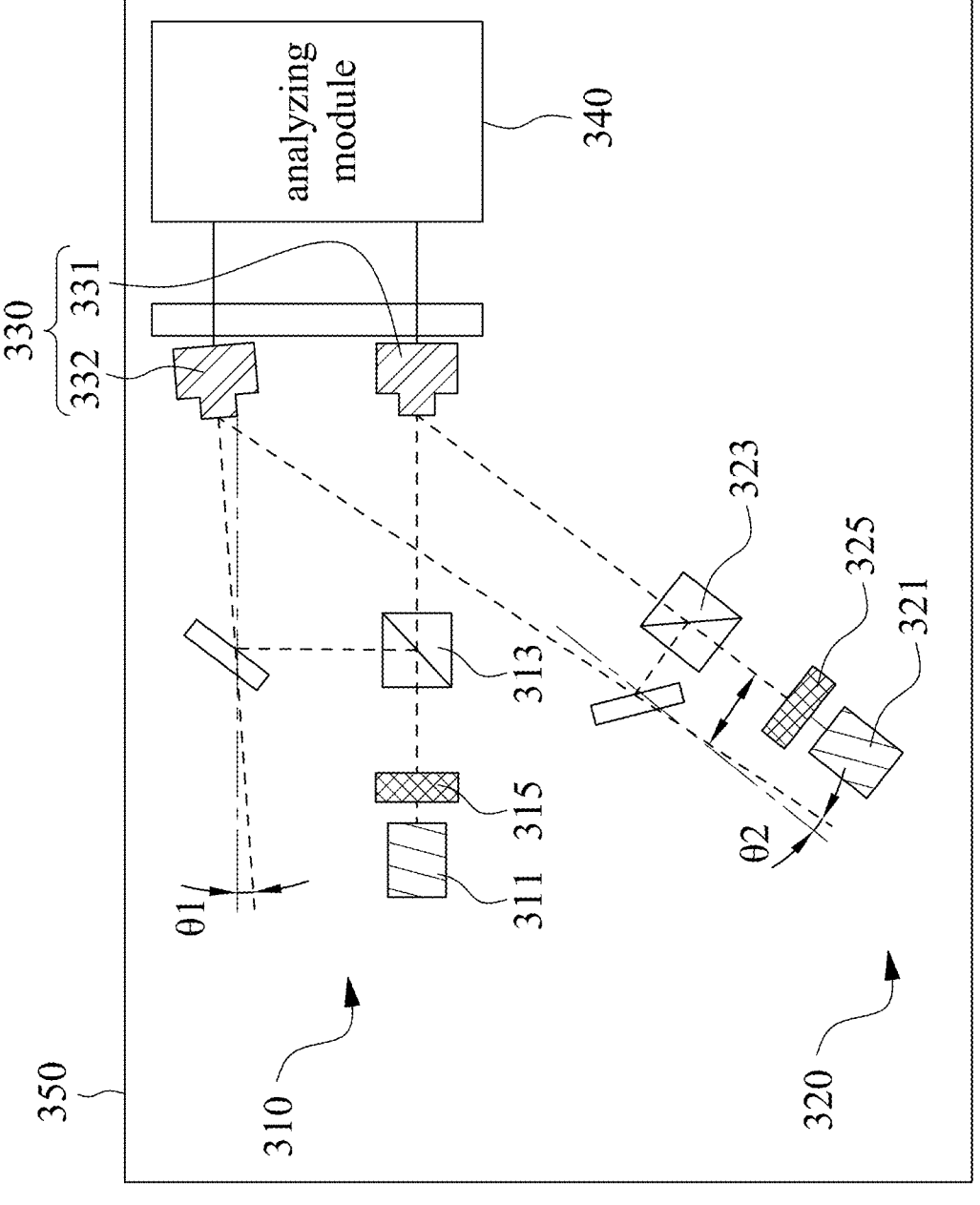
FIG. 6 shows a system configuration schematic view of a camera optical axis calibrating system according to a third embodiment of the present disclosure.

FIG. 6 shows a system configuration schematic view of a camera optical axis calibrating system 300 according to a third embodiment of the present disclosure. The camera optical axis calibrating system 300 includes two laser modules 310, 320, a first camera assembly 331, a second camera assembly 332 and an analyzing module 340. The configuration of the camera optical axis calibrating system 300 is similar to the configuration of the camera optical axis calibrating system 200 of the second embodiment, only the differences are described, and the identical details will not be repeated.

Each of the laser modules 310, 320 can further include a neutral density filter 315, 325 disposed between the splitting lens 313, 323 and the laser sources 311, 321 of each of the at least two laser modules 310, 320. Precisely, the neutral density filter 315 is located between the splitting lens 313 and the laser source 311, the neutral density filter 325 is located between the splitting lens 323 and the laser source 321, and the neutral density filter 315 and the neutral density filter 325 are used to lower the laser power of the laser sources 311, 321. In addition, the camera optical axis calibrating system 300 may further include a dark room 350, and the two laser modules 310, 320 and the camera module 330 are disposed in the dark room 350, thereby favorable for preventing the environment light from affecting the image.

Figure 7:
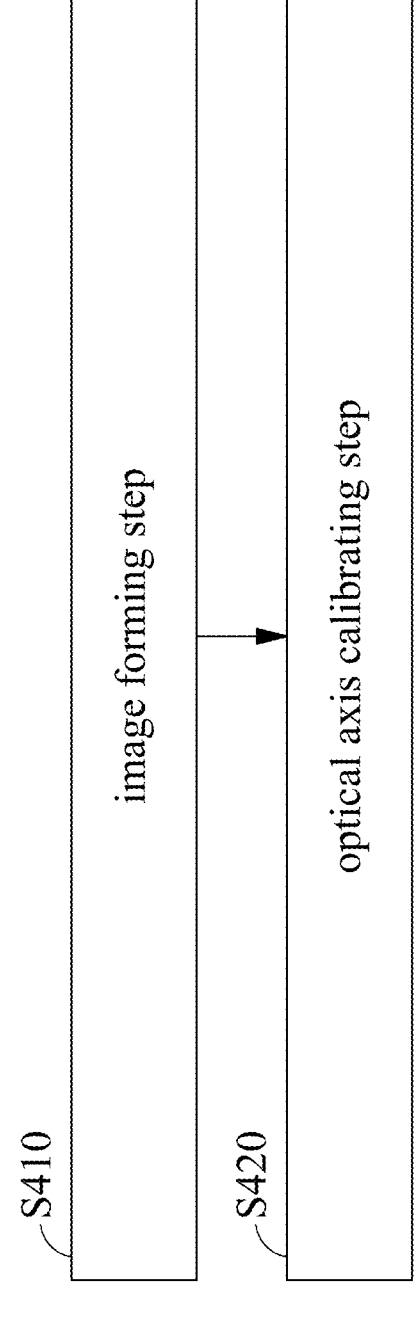
FIG. 7 shows a block flow chart of a camera optical axis calibrating method according to a fourth embodiment of the present disclosure.

FIG. 7 shows a block flow chart of a camera optical axis calibrating method S400 according to a fourth embodiment of the present disclosure. The camera optical axis calibrating method S400 includes an image forming step S410 and an optical axis calibrating step S420.

Please refer to FIGS. 4, 5 and 7, in the image forming step S410, the at least two light beam sets L1, L2 are received by the camera module 230. The camera module 230 at least includes the first camera assembly 231 and the second camera assembly 232. Each of the two light beam sets L1, L2 at least includes the first light beam L11, L21 and the second light beam L12, L22. The first camera assembly 231 receives and shoots the first light beam L11, L21 of each of the at least two light beam sets L1, L2 to form the first imaging plane P21, and the second camera assembly 232 receives and shoots the second light beam L12, L22 of each of the at least two light beam sets L1, L2 to form the second imaging plane P22. The first imaging plane P21 includes the at least two first imaging points P21a, P21b that do not overlap and respectively correspond to the first light beams L11, L21 of the at least two light beam sets L1, L2, and the second imaging plane P22 includes the at least two second imaging points P22a, P22b that do not overlap and respectively correspond to the second light beams L12, L22 of the at least two light beam sets L1, L2.

In the optical axis calibrating step S420, the space relation of the first camera assembly 231 and the second camera assembly 232 is configured that the at least two first imaging points P21a, P21b of the first imaging plane P21 are located at the first inclined line S21 passing through the center of the first imaging plane P21, the at least two second imaging points P22a, P22b of the second imaging plane P22 are located at the second inclined line S22 passing through the center of the second imaging plane P22, and the imaging angle difference between the first imaging angle α21 and the second image angle α22 is smaller than or equal to 1 degree. The first imaging angle α21 is contained between the first inclined line S21 and the first horizontal axis of the first imaging plane P21, and the second imaging angle α22 is contained between the second inclined line S22 and the second horizontal axis of the second imaging plane P22.

Precisely, in the image forming step S410, at least one of the first light beam L11 and the second light beam L12 of the light beam set L1 is adjusted to allow the light beam angle difference θ1 to be equal to the optical axis angle difference θ. For example, the reflecting lens 214 of the laser module 210 may be adjusted to allow the light beam angle difference θ1 to be equal to the optical axis angle difference θ. To be more specific, the setting distance d2 of the splitting lens 213 of the laser module 210 is defined in advance to allow the light emitting axis of the laser module 210 to overlap the first optical axis A21. After which, the rotated angle of the reflecting lens 214 is adjusted to allow the light beam angle difference θ1 to be equal to the optical axis angle difference θ, and the position of the reflecting lens 214 of the laser module 210 is adjusted to allow the locating distance d1 of the laser module 210 to satisfy the condition of d1=(D2−d2)×θ. In FIG. 4, the light beam set L2 may be adjusted to allow the light beam angle difference θ2 to be equal to the optical axis angle difference θ, thereby favorable for increasing the calibrating speed and the calibrating convenience, but the present disclosure is not limited thereto. It is noted that, if the light beam angle difference θ2 is not equal to the optical axis angle difference θ, the imaging plane adjusting method of FIG. 5 is more suitable than the imaging plane adjusting method of FIG. 2.

It is further noted that, two projected points may be set on a calibrating board, and a distance between the two projected points are equal to the optical axis distance D1. Hence, in the image forming step S410, the first light beam L11, L21 and the second light beam L12, L22 of each of the two light beam sets L1, L2 may be projected to the calibrating board, thereby favorable for adjusting the positions. After the position of the laser modules 210, 220 are completely configured, the camera module 230 is replaced with the calibrating board, thereby favorable for confirming that whether the point positions of the first light beam L11, L21 and the second light beam L12, L22 satisfy the requirement.

Moreover, in the optical axis calibrating step S420, the first camera assembly 231 may be adjusted first to allow the first inclined line S21 forming by the at least two first imaging points P21a, P21b of the first imaging plane P21 to pass the center of the first imaging plane P21, then the first imaging plane P21 is taken as a reference to adjust the second camera assembly 232 to allow the second inclined line S22 forming by the at least two second imaging points P22a, P22b of the second imaging plane to pass the center of the second imaging plane P22a, P22b.

To be more specific, the first camera assembly 231 may be adjusted first to position one of the at least two first imaging points P21a, P21b, e.g., the first imaging points P21a, in the center of the first imaging plane P21 to allow the first inclined line S21 to pass the center of the first imaging plane P21. After which, the second camera assembly 232 is adjusted to position one of the at least two second imaging points P22a, P22b, e.g., the second imaging points P22a, in the center of the second imaging plane P22 to allow the second inclined line S22 to pass the center of the second imaging plane P22, and the second camera assembly 232 is adjusted continuously to allow the imaging angle difference between the first imaging angle α21 and the second imaging angle α22 to be smaller than or equal to 1 degree. In other embodiments, there is no specific adjusting order, and it is only required that the imaging angle difference of the first imaging angle and the second imaging angle to be smaller than or equal to 1 degree. In addition, the ratio relation of the line distances may be further adjusted as the aforementioned details, but the present disclosure is not limited thereto.

Please refer to FIGS. 6 and 7, in the image forming step S410, the two laser modules 310, 320 and the camera module 330 may be disposed in the dark room 350 first, and then the first imaging plane and the second imaging plane are formed. It is noted that, the laser modules 110, 120 and the camera module 130 of the first embodiment, and the laser modules 210, 220 and the camera module 230 of the second embodiment may be also disposed in the dark room, and the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A camera optical axis calibrating system, comprising:
   at least two laser modules configured to generate at least two light beam sets, wherein each of the at least two light beam sets comprises a first light beam and a second light beam, and a light beam angle difference is contained between the first light beam and the second light beam of each of the at least two light beam sets;
   a camera module at least comprising a first camera assembly and a second camera assembly, wherein the first camera assembly has a first optical axis, the second camera assembly has a second optical axis, an optical axis distance and an optical axis angle difference are contained between the first optical axis and the second optical axis, the first camera assembly shoots the first light beam of each of the at least two light beam sets to form a first imaging plane, the second camera assembly shoots the second light beam of each of the at least two light beam sets to form a second imaging plane, the first imaging plane comprises at least two first imaging points that do not overlap and respectively correspond to the first light beams of the at least two light beam sets, and the second imaging plane comprises at least two second imaging points that do not overlap and respectively correspond to the second light beams of the at least two light beam sets; and
   an analyzing module configured to analyze the first imaging plane and the second imaging plane;
   wherein the light beam angle difference of at least one of the at least two light beam sets is equal to the optical axis angle difference, and the analyzing module is configured to confirm whether a space relation between the first camera assembly and the second camera assembly is that the at least two first imaging points are located at a first inclined line passing through a center of the first imaging plane, the at least two second imaging points are located at a second inclined line passing through a center of the second imaging plane, and an imaging angle difference between a first imaging angle and a second image angle is smaller than or equal to 1 degree, wherein the first imaging angle is contained between the first inclined line and a first horizontal axis of the first imaging plane, and the second imaging angle is contained between the second inclined line and a second horizontal axis of the second imaging plane.

2. The camera optical axis calibrating system of claim 1, wherein a number of the at least two laser modules is two, a number of the at least two light beam sets is two, each of the two laser modules comprises two laser sources that respectively generate the first light beam and the second light beam of each of the two light beam sets, each of the laser sources comprises a light emitting axis, and an angle contained between the two light emitting axes of each of the two laser sources is equal to the light beam angle difference.

3. The camera optical axis calibrating system of claim 1, wherein a number of the at least two laser modules is two, a number of the at least two light beam sets is two, each of the two laser modules comprises a laser source, a splitting lens and a reflecting lens, in a first one of the at least two laser modules, an initial light beam generated by the laser source passes the splitting lens corresponding thereto to form the first light beam of a first one of the at least two light beam sets, and the initial light beam generated by the laser source passes the splitting lens and the reflecting lens corresponding thereto to form the second light beam of the first one of the at least two light beam sets.

4. The camera optical axis calibrating system of claim 3, wherein as configuring the first one of the at least two laser modules, d1 represents a locating distance between the splitting lens and the reflecting lens of the first one of the at least two laser modules, d2 represents a setting distance between the splitting lens of the first one of the at least two laser modules and the first camera assembly, D2 represents a cross point distance between a cross point of the first optical axis and the second optical axis and the first camera assembly, the light emitting axis of the first one of the at least two laser modules overlaps the first optical axis, the locating distance satisfies a condition of d1=(D2−d2)×θ, and θ represents the optical axis angle difference.

5. The camera optical axis calibrating system of claim 4, wherein an included angle is contained between the light emitting axis of a second one of the at least two laser modules and the first optical axis, and the included angle is larger than 0 degree and smaller than 90 degrees.

6. The camera optical axis calibrating system of claim 3, wherein each of the at least two laser modules further comprises a neutral density filter disposed between the splitting lens and the laser source of each of the at least two laser modules.

7. The camera optical axis calibrating system of claim 1, wherein the center of the first imaging plane comprises a first rectangle area, a side length of the first rectangle area is between 2 pixels to 10 pixels, the center of the second imaging plane comprises a second rectangle area, and a side length of the second rectangle area is between 2 pixels to 10 pixels.

8. The camera optical axis calibrating system of claim 1, wherein the camera module further comprises a reference article, the first camera assembly is fixed at the reference article, and the second camera assembly is rotatably disposed at the reference article.

9. The camera optical axis calibrating system of claim 1, further comprising a dark room, wherein the at least two laser modules and the camera module are disposed in the dark room.

10. A camera optical axis calibrating method, comprising:
an image forming step, wherein at least two light beam sets are received by a camera module, the camera module at least comprises a first camera assembly and a second camera assembly, each of the at least two light beam sets at least comprises a first light beam and a second light beam, the first camera assembly receives and shoots the first light beam of each of the at least two light beam sets to form a first imaging plane, the second camera assembly receives and shoots the second light beam of each of the at least two light beam sets to form a second imaging plane, the first imaging plane comprises at least two first imaging points that do not overlap and respectively correspond to the first light beams of the at least two light beam sets, and the second imaging plane comprises at least two second imaging points that do not overlap and respectively correspond to the second light beams of the at least two light beam sets; and
an optical axis calibrating step, wherein a space relation of the first camera assembly and the second camera assembly is configured that the at least two first imaging points of the first imaging plane are located at a first inclined line passing through a center of the first imaging plane, the at least two second imaging points of the second imaging plane are located at a second inclined line passing through a center of the second imaging plane, and an imaging angle difference between a first imaging angle and a second image angle is smaller than or equal to 1 degree, wherein the first imaging angle is contained between the first inclined line and a first horizontal axis of the first imaging plane, and the second imaging angle is contained between the second inclined line and a second horizontal axis of the second imaging plane.

11. The camera optical axis calibrating method of claim 10, wherein in the image forming step, the first camera assembly has a first optical axis, the second camera assembly has a second optical axis, an optical axis angle difference is contained between the first optical axis and the second optical axis, a light beam angle difference is contained between the first light beam and the second light beam of each of the at least two light beam sets, at least one of the first light beam and the second light beam of at least one of the at least two light beam sets is adjusted to allow the light beam angle difference to be equal to the optical axis angle difference.

12. The camera optical axis calibrating method of claim 11, wherein in the image forming step, at least two laser modules respectively generate the at least two light beam sets, each of the at least two laser modules comprises a laser source, a splitting lens and a reflecting lens, in a first one of the at least two laser modules, an initial light beam generated by the laser source passes the splitting lens corresponding thereto to form the first light beam of a first one of the at least two light beam sets, and the initial light beam generated by the laser source passes the splitting lens and the reflecting lens corresponding thereto to form the second light beam of the first one of the at least two light beam sets.

13. The camera optical axis calibrating method of claim 12, wherein in the image forming step, at least the reflecting lens of the first one of the at least two laser modules is adjusted to allow the light beam angle difference of the first one of the at least two laser modules to be equal to the optical axis angle difference.

14. The camera optical axis calibrating method of claim 13, wherein d1 represents a locating distance between the splitting lens and the reflecting lens of the first one of the at least two laser modules, d2 represents a setting distance between the splitting lens of the first one of the at least two laser modules and the first camera assembly, D2 represents a cross point distance between a cross point of the first optical axis and the second optical axis and the first camera assembly, in the image forming step, the setting distance of the splitting lens of the first one of the at least two laser modules is defined in advance to allow the light emitting axis of the first one of the at least two laser modules to overlap the first optical axis, then a position of the reflecting lens of the first one of the at least two laser modules is adjusted to allow the locating distance of the first one of the at least two laser modules to satisfy a condition of d1=(D2− d2)×θ, and θ represents the optical axis angle difference.

15. The camera optical axis calibrating method of claim 14, wherein in the image forming step, an included angle is contained between the light emitting axis of a second one of the at least two laser modules and the first optical axis, and the included angle is larger than 0 degree and smaller than 90 degrees.

16. The camera optical axis calibrating method of claim 12, wherein in the image forming step, the at least two laser modules and the camera module are disposed in a dark room, and then the first imaging plane and the second imaging plane are obtained.

17. The camera optical axis calibrating method of claim 10, wherein in the optical axis calibrating step, the first camera assembly is adjusted first to allow the first inclined line forming by the at least two first imaging points of the first imaging plane to pass the center of the first imaging plane, then the first imaging plane is taken as a reference to adjust the second camera assembly to allow the second inclined line forming by the at least two second imaging points of the second imaging plane to pass the center of the second imaging plane and to allow the imaging angle difference between the first imaging angle and the second image angle to be smaller than or equal to 1 degree.

18. The camera optical axis calibrating method of claim 17, wherein in the optical axis calibrating step, the first camera assembly is adjusted first to position one of the at least two first imaging points in the center of the first imaging plane to allow the first inclined line to pass the center of the first imaging plane, then the second camera assembly is adjusted to position one of the at least two second imaging points in the center of the second imaging plane to allow the second inclined line to pass the center of the second imaging plane, and the second camera assembly is adjusted continuously to allow the imaging angle difference to be smaller than or equal to 1 degree.

*    *    *    *    *